Nov. 28, 1967  J. R. KELLER  3,354,623

UNIT FILTER ASSEMBLY

Filed Sept. 27, 1965

INVENTOR.
JOSEPH R. KELLER
BY
Ralph B. Brick
ATTORNEY

United States Patent Office 3,354,623
Patented Nov. 28, 1967

3,354,623
UNIT FILTER ASSEMBLY
Joseph R. Keller, Louisville, Ky., assignor to American Air Filter Company, Inc., Louisville, Ky., a corporation of Delaware
Filed Sept. 27, 1965, Ser. No. 490,224
4 Claims. (Cl. 55—484)

The present invention relates to unit filter assemblies and more particularly to an improved unit filter assembly which provides a plurality of filter banks across a gas stream to be treated.

In accordance with the present invention, a unit filter assembly of a type like that set forth in assignee's copending application Ser. No. 476,289, inventor David J. Murphy, Jr., is utilized. The present invention provides a novel modification which is simple and straightforward in construction, further reducing the structural parts required and further minimizing tooling and assembly steps. In addition, the present invention provides a sturdy filter construction which can be readily manipulated for installation and which can be readily adapted to use with particulate materials of various types.

Various other features of the present invention will become obvious to one skilled in the art upon reading the disclosure set forth hereinafter.

More particularly, the present invention provides a unit filter assembly comprising: an open-ended frame member having an upstream dirty gas inlet and a downstream clean gas outlet; a first set of spaced, longitudinally-extending, plenum-forming members of substantially U-shaped cross section disposed within the frame member, each having a base portion extending transversely across the dirty gas inlet and having perforated flank portions extending from the dirty gas inlet toward the clean gas outlet; a second set of spaced, longitudinally-extending, plenum-forming members of substantially U-shaped cross section disposed within the frame member, each having a base portion extending transversely across the clean gas outlet and having perforated flank portions extending from the clean gas outlet toward the dirty gas inlet, the flank portions of the first and second sets of plenum-forming members having inwardly turned flange members with the flange members of one set engaging against the flank portions of the opposite set to space adjacent flank portions of the first and second sets and form perforated plenum chambers therebetween; and filter media material disposed within such perforated plenum chambers in sufficient quantities to substantially fill the same.

It is to be understood that various changes can be made in the arrangement, form, and construction of the apparatus disclosed herein without departing from the scope or spirit of the present invention.

Referring to the drawing which discloses one advantageous embodiment of the present invention:

Figures 1, 2, 3, 4:
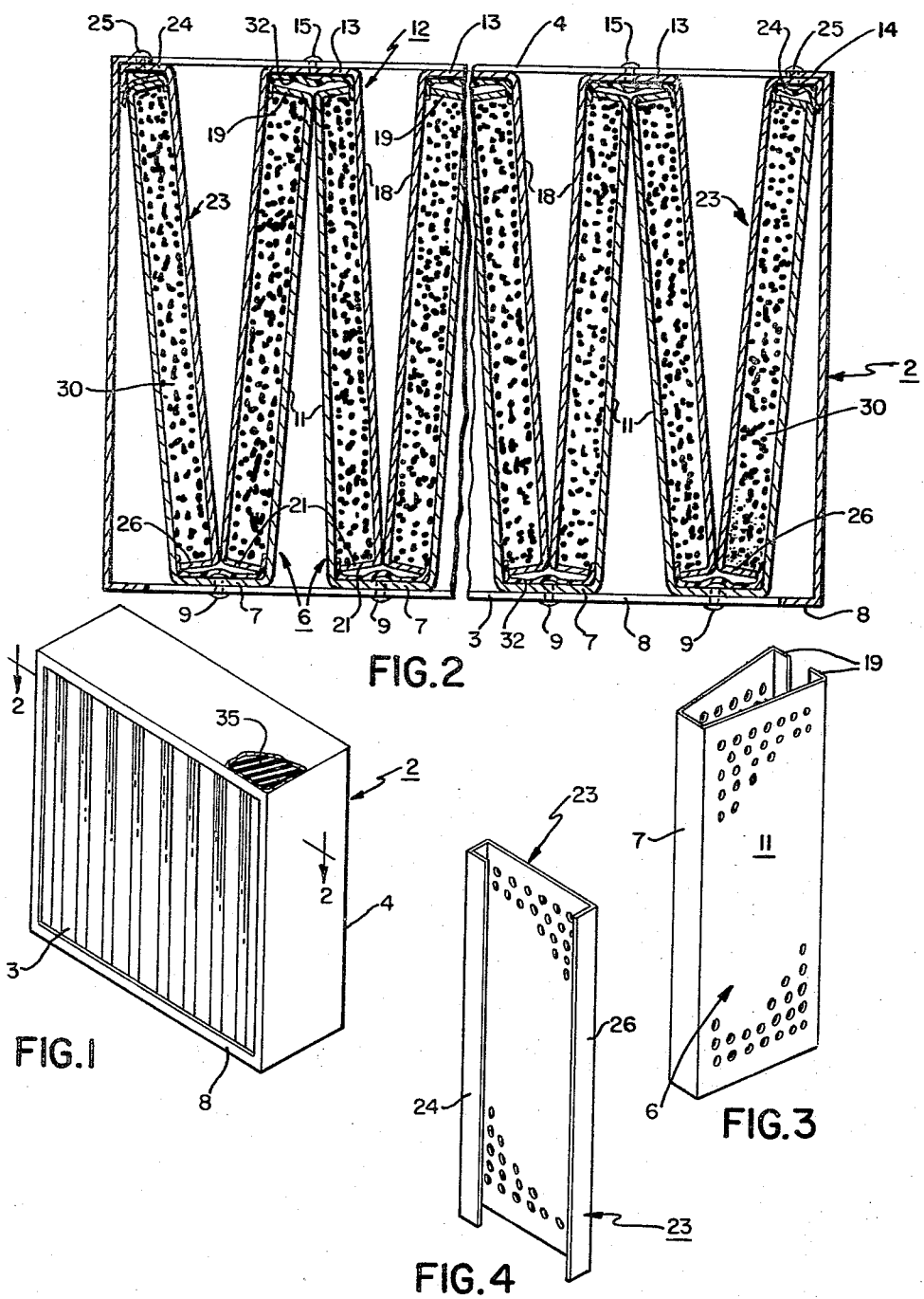
FIGURE 1 is an isometric view of the novel unit filter assembly.
FIGURE 2 is an enlarged, cross-sectional view taken in a plane passing through line 2—2 of FIGURE 1, disclosing a portion of the assembly of FIGURE 1.
FIGURE 3 is an isometric view of a U-shaped plenum-forming member utilized in construction of the assembly of FIGURES 1 and 2.
FIGURE 4 is an isometric view of a perforated end plate member utilized with one of the sets of the plenum-forming members in the construction of the assembly of FIGURES 1 and 2.

As can be seen in FIGURE 1 of the drawing, the inventive assembly includes open-ended rectangular frame member 2 having upstream dirty gas inlet 3 and downstream clean gas outlet 4. Frame member 2 can be formed from any one of a number of suitable materials such as wood or metal, and although advantageously shown in rectangular form, can be of other geometric configurations.

As can be seen more readily in FIGURES 2 to 4 of the drawing, to form plenum chambers in frame member 2, a first set of longitudinally-extending, plenum-forming members 6 (FIGURE 3) of substantially U-shaped cross section is provided. These plenum-forming members can be made of a suitable rigid and flexible material and advantageously, thin perforated metal sheets have been found suitable for this purpose. Each plenum-forming member 6 of the first set has its base portion 7 extending transverse the upstream face 3 of frame member 2 with the end extremities of the base portion being fastened to the upstream peripheral border 8 of frame 2 by means of suitable rivets 9. It is to be noted that plenum-forming members 6 have perforated flank portions 11 extending from dirty gas inlet 3 toward clean gas outlet 4 in diverging fashion.

A second set of longitudinally-extending, plenum-forming members 12 of substantially U-shaped cross section and of substantially the same configuration as the first set, as well as of the same material, is provided. Each plenum-forming member 12 of the second set has its base portion 13 extending transverse the downstream face 4 of the frame member 2 with the end extremities of the base portion being fastened to the downstream peripheral border 14 of frame 2 by means of suitable rivets 15 in a manner similar to the fastening aforedescribed for base portions 7 on the upstream peripheral border frame 8. Like plenum-forming members 6, plenum-forming members 12 have perforated flank portions 18. These flank portions 18 extend from clean gas outlet 4 toward dirty gas inlet 3 in diverging fashion parallel to and in spaced relationship with flank portions 11 of the first plenum-forming members 6. In this connection, it is to be noted that in order to keep the flank portions of the two plenum-forming sets in such spaced parallel relationship, the ends of each of the perforated flank portions 11 and 18 of the first and second sets 6 and 12, respectively, are provided with integral end flange members 19 and 21, respectively, which are inwardly turned to extend toward the flank portions of the opposite set. It further is to be noted that in the embodiment disclosed, there is one more plenum-forming member 6 in the first set than there is a plenum-forming member 12 in the second set. Accordingly, perforated end flank plates 23 (FIGURE 4) extending parallel to and spaced from perforated flank portions 11 of plenum-forming members 6 of the first set are provided, these perforated end flank plates each including a channel-shaped end portion 24 abutting the peripheral downstream border frame 14 and fastened thereto by means of rivets 25. It also is to be noted that perforated end flank plates 23 are provided with end flange members 26 at the extremities thereof in order to space the perforated end flange plates 23 from the flange portions 11 of the plenum-forming members 6 opposite thereto.

With the arrangement aforedescribed, it can be seen that a plurality of perforated plenum chambers 30 are formed which extend in V-shaped pleat bank form across the open-ended frame member 2. It is to be noted that suitable sealing gaskets 32 which can be of a soft, compressible material such as rubber, can be fastened to the base portions 7 and 13 of each of the plenum-forming members 6 and 12 to seal the end flange members 19 and 21 in their engagement against the flank portions. It also is to be noted that the opposite inner walls of frame member 2 against which the edges of plenum-forming members 6 and 12 abut can be provided with a sheet of soft, compressible and pliable sealing gasket material 35, such as rubber, to receive and seal such edges.

A suitable particulate filter media material, such as activated carbon, can be poured into plenums 30 when they are formed, the media material being supplied in sufficient quantities to substantially fill the same. In this connection it is to be noted that sealing gasket 35 can be of sufficient thickness and sufficient compressibility to yieldingly engage against and insure a certain amount of compressibility of the particulate media material disposed in the plenum chambers to accommodate any settling of such particulate material.

Thus, in accordance with the present invention, a filter assembly arrangement is provided which is straightforward, economical and simple in construction, requiring a minimum of structural parts and permitting ready manipulation for installation and removal of particulate media material.

The invention claimed is:

1. A unit filter assembly comprising: an open-ended frame member having an upstream dirty gas inlet and a downstream clean gas outlet; a first set of spaced, longitudinally-extending plenum-forming members of substantially U-shaped cross section disposed within said frame member, each having a base portion extending transversely across said dirty gas inlet and having perforated flank portions extending from said dirty gas inlet toward said clean gas outlet; a second set of spaced, longitudinally-extending plenum-forming members of substantially U-shaped cross section disposed within said frame member, each having a base portion extending transversely across said clean gas outlet and having perforated flank portions extending from said clean gas outlet toward said dirty gas inlet, the flank portions of said first and second sets having inwardly turned flanged members of smaller extent than said base portions engaging against flank portions of an opposite set of plenum-forming members to space adjacent flank portions of said first and second sets and form perforated plenum chambers therebetween; and filter media material disposed within said perforated plenum chambers in sufficient quantities to substantially fill the same.

2. The apparatus of claim 1, said inwardly turned flange members being positioned at the extremities of said flank portions opposite said base portions.

3. The apparatus of claim 2, and sealing gasket means fastened to said base portions of a set of plenum-forming members to sealingly cooperate with the inwardly turned flange members of the opposite set of plenum-forming members.

4. A unit filter assembly comprising: an open-ended rectangular frame member having an upstream dirty gas inlet and a downstream clean gas outlet; a first set of spaced, longitudinally-extending plenum-forming members of substantially U-shaped cross section disposed within said frame member, each having a base portion extending transversely across said dirty gas inlet and having perforated flank portions extending from said dirty gas inlet toward said clean gas outlet; a second set of spaced, longitudinally-extending plenum-forming members of substantially U-shaped cross section disposed within said frame member, each having a base portion extending transversely across said clean gas outlet and having perforated flank portions extending from said clean gas outlet toward said dirty gas inlet, said first and second sets of plenum-forming members differing in number by one with the set of lesser number including perforated end flank plates, said flank portions of said first and second sets and said flank plates having inwardly turned flange members of smaller extent than said base portion positioned at the extremities thereof to engage against the flank portions of an opposite set to space adjacent flank portions in parallel relation forming perforated plenum chambers therebetween; sealing gasket means fastened to said base portion of one set of plenum-forming members to sealingly cooperate with the flange portions of the opposite set of plenum-forming members; and filter media material disposed within said perforated plenum chambers in sufficient quantities to substantially fill the same.

References Cited
UNITED STATES PATENTS

| | | | |
|---|---|---|---|
| 2,053,159 | 9/1936 | Miller | 55—390 X |
| 2,199,632 | 5/1940 | Keyers. | |
| 2,499,949 | 3/1950 | Glanzer et al. | 55—484 |
| 2,589,229 | 3/1952 | Dauphinee | 55—387 X |
| 3,034,772 | 5/1962 | Schulz | 55—517 X |

BARRY B. THORNTON, *Primary Examiner.*

S. SOKOLOFF, *Assistant Examiner.*